Sept. 25, 1951     B. GELARDIN     2,569,159
GAS PERMEABLE COATING FOR DRY CELL FLASHLIGHT BATTERIES
Filed Jan. 9, 1947
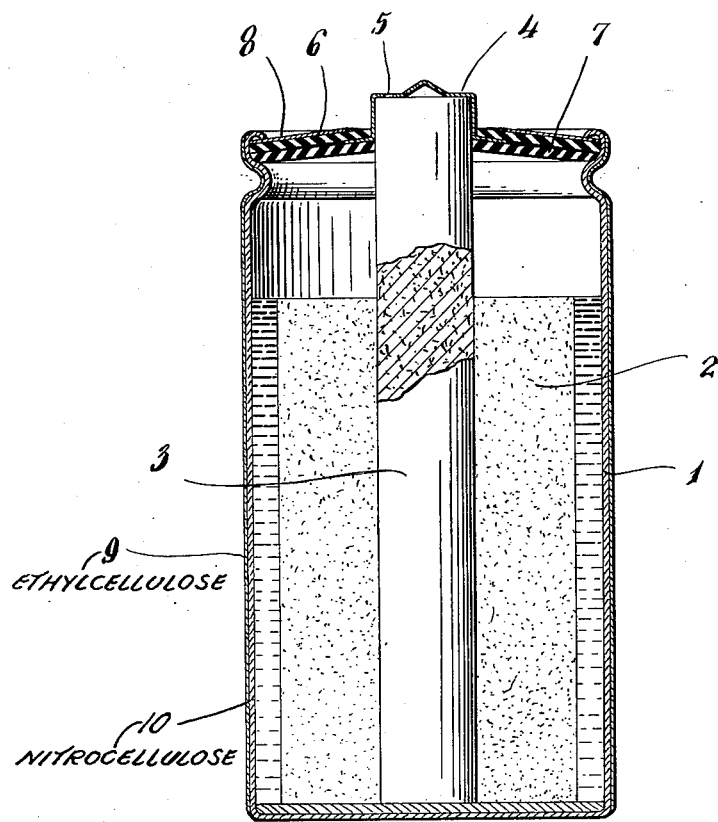
INVENTOR.
Benjamin Gelardin
BY H. Lee Helms
ATTORNEY.

Patented Sept. 25, 1951

2,569,159

UNITED STATES PATENT OFFICE 2,569,159

GAS PERMEABLE COATING FOR DRY CELL FLASHLIGHT BATTERIES

Benjamin Gelardin, New York, N. Y.

Application January 9, 1947, Serial No. 721,082

2 Claims. (Cl. 136—132)

1

This invention relates to dry cells of the type used in flashlights, more particularly to an improved construction for preventing leakage of the electrolyte and providing a gas permeable coating for the dry cell.

The primary object of this invention is the provision of a thin coating of laminated plastic materials intimately embracing the exterior of the zinc container of the dry cell, said lamination of plastic materials providing a coating impervious to moisture but penetrable by gases. Since the coating is moisture impervious the electrolyte is retained within the cell and does not leak through the coating of the cell even after the zinc container has been damaged, broken through or consumed.

The moisture-impervious coating furthermore prevents the electrolyte within the cell from absorbing moisture from the air which would cause a swelling of the battery.

A further object of this invention is to provide a gas-penetrable coating for the dry cell. The gases generated within said cell during its use and storage, which burst through the zinc wall in places where the zinc wall has been consumed, are able to escape through said gas penetrable coating, thereby relieving the pressure within the cell and preventing the accumulation of excessive pressures within said cell which would cause the outer coating to rupture and a subsequent leakage of the electrolyte through the damaged portions of the cell coating.

In a dry cell not provided with a gas-penetrable coating, gases generated during the activity of the cell exert pressures in all directions. Even where these cells have been provided with a vent at the top of the cell, substantial pressures are often built up within the cell because frequently the free passage of the gases not directly adjacent to the vent is obstructed. The gases retained within a cell coated with a strong gas-impenetrable coating, such as steels or thick plastics, have built up pressures high enough to force the electrolyte to leak through the closure seams of the cell coatings. In dry cells which have a moisture pervious coating and a gas impenetrable coating, the swelling due to the absorption of moisture from the air by the electrolyte and the collected gas pressure will always force a breaking of the outer coating and leakage of the electrolyte, this is true becaues the zinc container is one of the active ingredients of the cell and is consumed during the cell action. The electrolyte will leak through the zinc wall after openings have been caused either by total consumption of the zinc or through gas pressure.

In the drawing the zinc can 1 contains a mix consisting of the usual materials 2, a carbon electrode 3 bearing a cap 4 and having a vent 5 and two washers 6 and 7, a top cover 8 and a thin plastic coating having an outer face 9 and an inner face 10. The parts described are old and well known in the art and the invention resides in coating the zinc can on its sides with a thin plastic material comprising nitrocellulose and ethylcellulose and having a thickness of between 0.001" to 0.010". The thickness of the material is determined by the fact that it has been found that materials of less than 0.001" do not have a sufficient physical strength to resist rupture whilst materials in excess of 0.010" are not sufficiently gas permeable and are not economical.

The plastic coatings are not applied to the bottom of the cell so that an electrical contact can easily be maintained.

The plastic coatings are applied in such manner that there are no connecting seams in said coating but said coating forms one uniform surface directly and closely adherent to the exterior surface of the sides of the container electrode. The over-grip of the plastic coating at the top of the cell insulates the top against short circuits.

A preferred embodiment of this invention is to first apply a coating of 0.003" nitrocellulose solution having a solids content of 15 to 25% and apply directly thereto a second coating consisting of approximately 0.002" of ethylcellulose. The two adjacent coats are self-laminating and provide moisture-impervious gas-penetrable coating having the necessary degree of tensile strength required.

The two coatings laminate to such an extent that they form one uniform plastic sheet comprising the qualities desired.

Having described my invention, what I claim is as follows:

1. In a dry cell, a zinc container electrode and a gas-permeable coating formed of two different plastic materials superimposed upon each other and upon the exterior surface of the sides of the container electrode and comprising a layer of nitrocellulose and a layer of ethyl cellulose adherent to the first-named layer, the composite coating being between 0.001 to 0.010" in thickness, one of said layers being adherent to the container electrode.

2. In a dry cell, a zinc container electrode and a gas-permeable coating formed of two plastic materials superimposed upon the exterior of the side surface of the container electrode and comprising a layer of nitrocellulose of substantially .003 of an inch thickness and a layer of ethylcellulose of substantially .002 of an inch thickness adherent to the first-named layer, one of said layers being adherent to the container electrode.

BENJAMIN GELARDIN.

REFERENCES CITED

The following references are of record in the file of this patent:

UNITED STATES PATENTS

| Number | Name | Date |
|---|---|---|
| 1,368,479 | Brown | Feb. 15, 1921 |
| 1,515,945 | French | Nov. 18, 1924 |
| 1,711,739 | Marsal | May 7, 1929 |
| 2,307,763 | Deibel | Jan. 12, 1943 |

FOREIGN PATENTS

| Number | Country | Date |
|---|---|---|
| 471,425 | Great Britain | Sept. 3, 1937 |